(12) United States Patent
Taherzadeh Boroujeni et al.

(10) Patent No.: US 11,469,803 B2
(45) Date of Patent: Oct. 11, 2022

(54) MULTI-PART LAYER 1 REPORTING

(71) Applicant: QUALCOMM Incorporated, San Diego, CA (US)

(72) Inventors: Mahmoud Taherzadeh Boroujeni, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/233,014

(22) Filed: Apr. 16, 2021

(65) Prior Publication Data
US 2021/0336670 A1 Oct. 28, 2021

Related U.S. Application Data

(60) Provisional application No. 63/015,318, filed on Apr. 24, 2020, provisional application No. 63/015,236, filed on Apr. 24, 2020.

(51) Int. Cl.
*H04W 24/10* (2009.01)
*H04B 7/06* (2006.01)

(52) U.S. Cl.
CPC ......... *H04B 7/0617* (2013.01); *H04B 7/0626* (2013.01); *H04B 7/0695* (2013.01); *H04W 24/10* (2013.01)

(58) Field of Classification Search
CPC .. H04B 7/0617; H04B 7/0626; H04B 7/0695; H04B 7/0636; H04B 17/318; H04B 17/336; H04W 24/10; H04W 72/085; H04L 5/0023
See application file for complete search history.

(56) References Cited

U.S. PATENT DOCUMENTS

| | | | |
|---|---|---|---|
| 11,095,352 B2* | 8/2021 | Kung | H04W 48/16 |
| 2019/0081753 A1* | 3/2019 | Jung | H04B 7/063 |
| 2019/0306924 A1 | 10/2019 | Zhang et al. | |
| 2019/0334603 A1 | 10/2019 | Venugopal et al. | |
| 2019/0342807 A1* | 11/2019 | Harada | H04W 24/08 |
| 2020/0021336 A1* | 1/2020 | Da Silva | H04B 17/309 |
| 2021/0051754 A1* | 2/2021 | Zhou | H04B 7/0695 |
| 2021/0084640 A1* | 3/2021 | Kang | H04L 5/0048 |
| 2021/0297850 A1* | 9/2021 | Matsumura | H04W 24/10 |
| 2021/0314038 A1* | 10/2021 | Matsumura | H04B 7/0602 |

(Continued)

OTHER PUBLICATIONS

International Search Report and Written Opinion—PCT/US2021/070417—ISA/EPO—Aug. 31, 2021.

(Continued)

*Primary Examiner* — Kenneth T Lam
(74) *Attorney, Agent, or Firm* — Harrity & Harrity, LLP

(57) ABSTRACT

Various aspects of the present disclosure generally relate to wireless communication. In some aspects, a user equipment may transmit a first part of a Layer 1 measurement report, wherein the first part includes measurement information for a first set of beams; and transmit a second part of the Layer 1 measurement report, wherein the second part includes measurement information for a second set of beams, wherein the second set of beams is different than the first set of beams, and wherein the first part and the second part are transmitted using different time resources. Numerous other aspects are provided.

30 Claims, 8 Drawing Sheets

(56) References Cited

U.S. PATENT DOCUMENTS

2021/0314931 A1* 10/2021 Farag .................. H04B 7/0695
2022/0095406 A1* 3/2022 Ahn ..................... H04W 76/19

OTHER PUBLICATIONS

NTT DOCOMO, Inc: "Discussion on Multi-Beam Enhancement", 3GPP Draft, 3GPP TSG RAN WG1 Meeting #99, R1-1912894, 3rd Generation Partnership Project (3GPP), Mobile Competence Centre, 650, Route Des Lucioles, F-06921, Sophia-Antipolis Cedex, France, vol. RAN WG1. No. Reno, USA, Nov. 18-Nov. 22, 2019, Nov. 8, 2019 (Nov. 8, 2019), XP051820230, pp. 1-15, Retrieved from the Internet: URL: https://ftp.3gpp.org/tsg_ran/WG1_RL1/TSGR1_99/Docs/R1-1912894.zip R1-1912894.docx [retrieved on Nov. 8, 2019] paragraph 4.2.1 paragraph 4.2.2, The whole document.

VIVO: "Discussion on Multi-Beam Operation", 3GPP Draft, 3GPP TSG RAN WG1 Ad-Hoc Meeting 1901, R1-1900138 Discussion on Multi-Beam Operation, 3rd Generation Partnership Project (3GPP), Mobile Competence Centre 650, Route Des Lucioles, F-06921 Sophia-Antipolis Cedex, France, vol. RAN WG1, No. Taipei, Jan. 21-Jan. 25, 2019 Jan. 20, 2019 (Jan. 20, 2019), XP051593064, 10 Pages, Retrieved from the Internet: URL:http://www.3gpp.org/ftp/Meetings%5F3GPP%5FSYNC/RAN1/Docs/R1%2D1900138%2Ezip [retrieved on Jan. 20, 2019] p. 4, 3, UL multi-panel/multi-beam transmission.

* cited by examiner

MULTI-PART LAYER 1 REPORTING

CROSS-REFERENCE TO RELATED APPLICATION

This Patent Application claims priority to U.S. Provisional Patent Application No. 63/015,236, filed on Apr. 24, 2020, entitled "MULTI-PART LAYER 1 REPORTING," and to U.S. Provisional Patent Application No. 63/015,318, filed on Apr. 24, 2020, entitled "METHOD OF SETTING ALTERNATIVE FORMAT FOR CSI REPORT OF L1-RSRP OR L1-SINR," both assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for multi-part Layer 1 reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include transmitting a first part of a Layer 1 measurement report, wherein the first part includes measurement information for a first set of beams; and transmitting a second part of the Layer 1 measurement report, wherein the second part includes measurement information for a second set of beams, wherein the second set of beams is different than the first set of beams, and wherein the first part and the second part are transmitted using different time resources.

In some aspects, a UE for wireless communication may include memory and one or more processors operatively coupled to the memory. The memory and the one or more processors may be configured to transmit a first part of a Layer 1 measurement report, wherein the first part includes measurement information for a first set of beams; and transmit a second part of the Layer 1 measurement report, wherein the second part includes measurement information for a second set of beams, wherein the second set of beams is different than the first set of beams, and wherein the first part and the second part are transmitted using different time resources.

In some aspects, a non-transitory computer-readable medium may store one or more instructions for wireless communication. The one or more instructions, when executed by one or more processors of a UE, may cause the one or more processors to transmit a first part of a Layer 1 measurement report, wherein the first part includes measurement information for a first set of beams; and transmit a second part of the Layer 1 measurement report, wherein the second part includes measurement information for a second set of beams, wherein the second set of beams is different than the first set of beams, and wherein the first part and the second part are transmitted using different time resources.

In some aspects, an apparatus for wireless communication may include means for transmitting a first part of a Layer 1 measurement report, wherein the first part includes measurement information for a first set of beams; and means for transmitting a second part of the Layer 1 measurement report, wherein the second part includes measurement information for a second set of beams, wherein the second set of beams is different than the first set of beams, and wherein the first part and the second part are transmitted using different time resources.

In some aspects, a method of wireless communication, performed by a base station, may include receiving a first part of a Layer 1 measurement report, wherein the first part includes measurement information for a first set of beams; and receiving a second part of the Layer 1 measurement report, wherein the second part includes measurement information for a second set of beams, wherein the second set of beams is different than the first set of beams, wherein the first part and the second part are received using different time resources, and wherein the first set of beams and the second set of beams are associated with a single UE.

In some aspects, a base station for wireless communication may include memory and one or more processors operatively coupled to the memory. The memory and the one or more processors may be configured to receive a first part of a Layer 1 measurement report, wherein the first part includes measurement information for a first set of beams; and receive a second part of the Layer 1 measurement report, wherein the second part includes measurement information for a second set of beams, wherein the second set of beams is different than the first set of beams, wherein the first part and the second part are received using different time resources, and wherein the first set of beams and the second set of beams are associated with a single UE.

In some aspects, a non-transitory computer-readable medium may store one or more instructions for wireless communication. The one or more instructions, when executed by one or more processors of a base station, may cause the one or more processors to receive a first part of a Layer 1 measurement report, wherein the first part includes measurement information for a first set of beams; and receive a second part of the Layer 1 measurement report, wherein the second part includes measurement information for a second set of beams, wherein the second set of beams is different than the first set of beams, wherein the first part and the second part are received using different time resources, and wherein the first set of beams and the second set of beams are associated with a single UE.

In some aspects, an apparatus for wireless communication may include means for receiving a first part of a Layer 1 measurement report, wherein the first part includes measurement information for a first set of beams; and means for receiving a second part of the Layer 1 measurement report, wherein the second part includes measurement information for a second set of beams, wherein the second set of beams is different than the first set of beams, wherein the first part and the second part are received using different time resources, and wherein the first set of beams and the second set of beams are associated with a single UE.

In an aspect of the disclosure, a method, a computer-readable medium, and an apparatus are provided. The apparatus may be a device within a UE. The device may receive, from a BS, at least one of a semi-static and/or a dynamically CSI report configuration to select a format or a subset of formats from a set of formats. The UE may select the format or the subset of formats from a set of formats for reporting at least one of an L1-RSRP measurement and/or an L1-SINR measurement in a CSI report. The UE may also determine a format from the subset of formats based on at least one of the L1-RSRP measurement and/or the L1-SINR measurement. The UE may receive at least one of a synchronization signal block (SSB) and/or CSI reference signal (RS) (CSI-RS) and generate the CSI report based on the received at least one of SSB and/or CSI-RS and according to the selected format.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
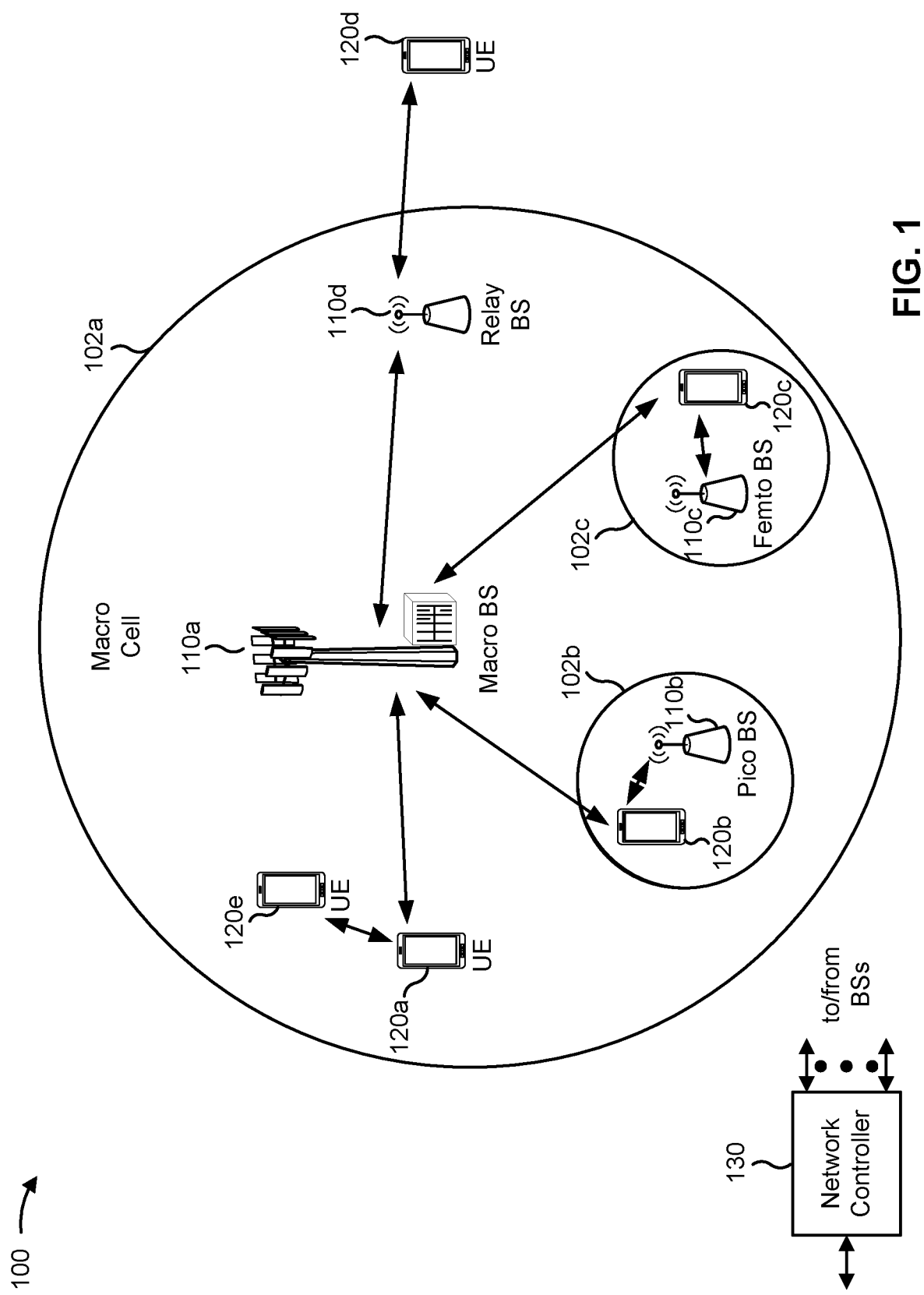
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
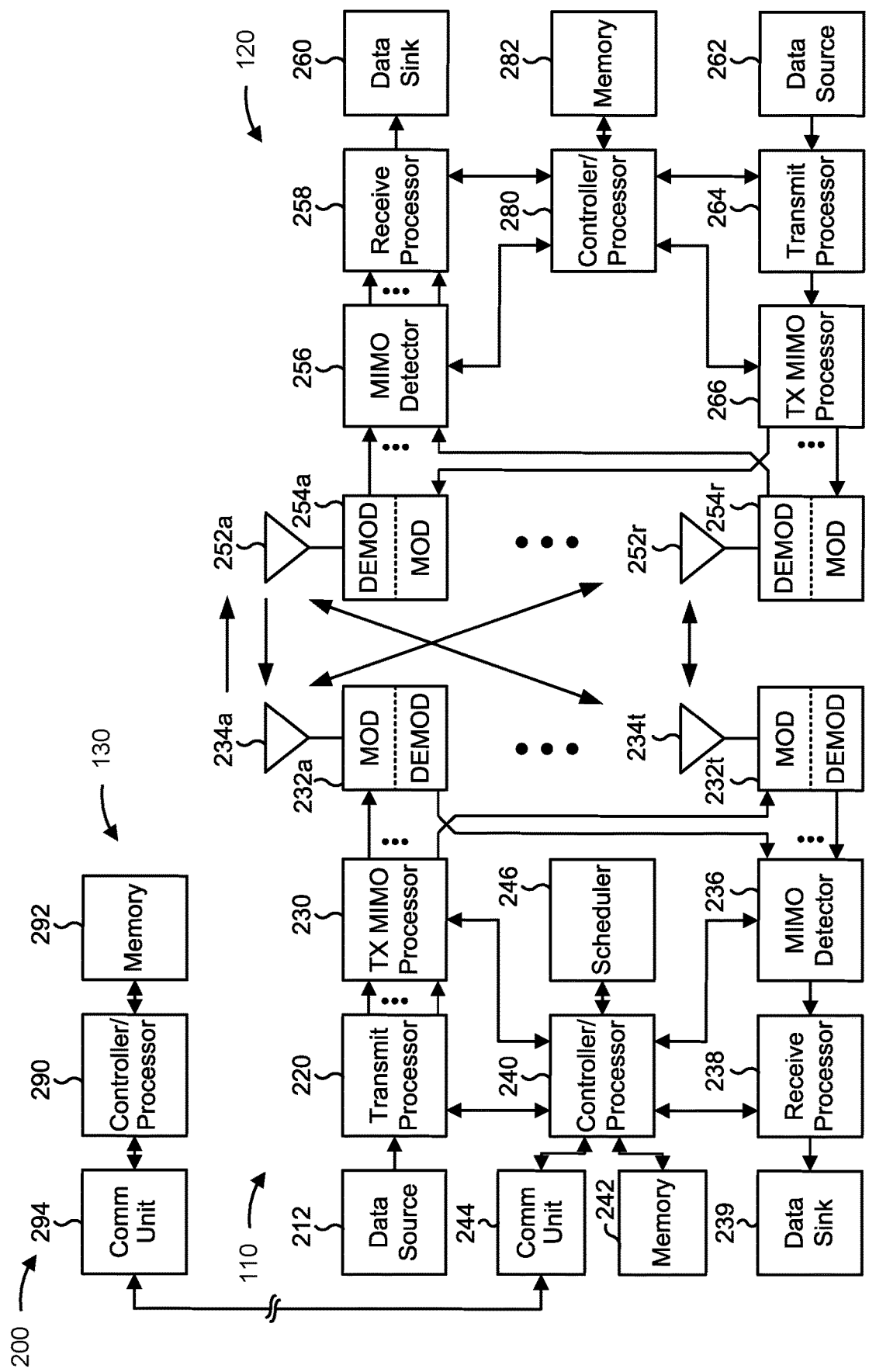
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-6.

Controller/processor 240 of base station 110, controller/processor 280 of UE 120, and/or any other component(s) of FIG. 2 may perform one or more techniques associated with multi-part Layer 1 reporting, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, process 800 of FIG. 8, and/or other processes as described herein. In some aspects, executing instructions may include running the instructions, converting the instructions, compiling the instructions, and/or interpreting the instructions, among other examples.

In some aspects, UE 120 may include means for transmitting a first part of a Layer 1 measurement report, wherein the first part includes measurement information for a first set of beams; means for transmitting a second part of the Layer 1 measurement report, wherein the second part includes measurement information for a second set of beams, wherein the second set of beams is different than the first set of beams, and wherein the first part and the second part are transmitted using different time resources; means for receiving signaling indicating that the Layer 1 measurement report is to be transmitted as the first part and the second part, wherein transmitting the first part and transmitting the second part are based at least in part on the signaling; means for determining that the Layer 1 measurement report is to be transmitted as the first part and the second part, wherein transmitting the first part and transmitting the second part are based at least in part on the determination; means for transmitting information indicating that the Layer 1 measurement report is to be transmitted as the first part and the second part; means for transmitting a third part of the Layer 1 measurement report, wherein the third part includes measurement information for a third set of beams different than the first set of beams and the second set of beams; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving a first part of a Layer 1 measurement report, wherein the first part includes measurement information for a first set of beams; means for receiving a second part of the Layer 1 measurement report, wherein the second part includes measurement information for a second set of beams, wherein the second set of beams is different than the first set of beams, wherein the first part and the second part are received using different time resources, and wherein the first set of beams and the second set of beams are associated with a single UE; means for transmitting signaling indicating that the Layer 1 measurement report is to be transmitted as the first part and the second part, wherein receiving the first part and receiving the second part are based at least in part on the signaling; means for receiving information indicating that the Layer 1 measurement report is to be transmitted as the first part and the second part; means for receiving a third part of the Layer 1 measurement report, wherein the third part includes measurement information for a third set of beams different than the first set of beams and the second set of beams; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
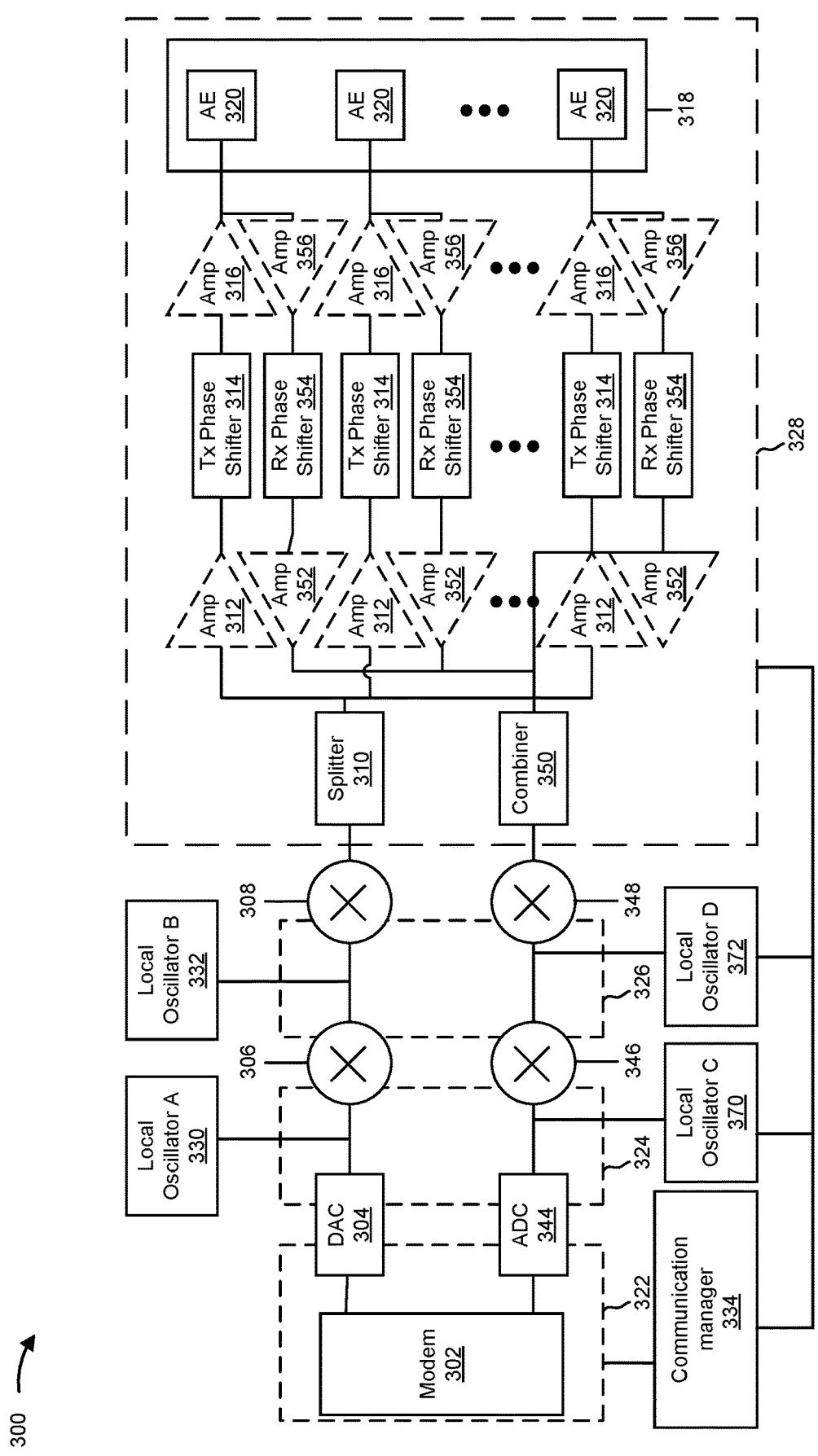
FIG. 3 is a diagram illustrating an example beamforming architecture that supports unicast coverage in a millimeter wave (mmW) channel, in accordance with the present disclosure.

FIG. 3 is a diagram illustrating an example beamforming architecture 300 that supports unicast coverage in a millimeter wave (mmW) channel, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, traces, and/or the like are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a communication manager 334.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the communication manager 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or the communication manager 334) to provide independent control of the gain for each antenna element 320. For example, the modem 302 and/or the communication manager 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be set to provide a desired amount of phase shift or the same amount of phase shift or some other configuration. The modem 302 and/or the communication manager 334 may have at least one control line connected to each of the phase shifters 314 and which may be used to configure the phase shifters 314 to provide desired amounts of phase shift or phase offset between antenna elements 320.

In the illustrated architecture 300, RF signals received by the antenna elements 320 are provided to one or more of first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more of phase shifters 354 to provide a configurable phase shift or phase offset for the corresponding received RF signal. The phase shifter 354 may be an active phase shifter or a passive phase shifter. The settings of the phase shifters 354 are independent, meaning that each can be set to provide a desired amount of phase shift or the same amount of phase shift or some other configuration. The modem 302 and/or the communication manager 334 may have at least one control line connected to each of the phase shifters 354 and which may be used to configure the phase shifters 354 to provide a desired amount of phase shift or phase offset between antenna elements 320.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, and/or the like.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the communication manager 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The communication manager 334 may be located partially or fully within one or more other components of the architecture 300. For example, the communication manager 334 may be located within the modem 302 in some aspects.

The communication manager 334, controller/processor 280, receive processor 258, and/or the like may manage the measurement of beams by the architecture 300. For example, this measurement may include the determination of channel state information (CSI) based at least in part on a CSI report setting. The CSI may be based at least in part on a Layer 1 measurement, such as a Layer 1 RSRP, a Layer 1 signal to interference plus noise (SINR) value, a CQI, a precoding matrix indicator (PMI), a CSI reference signal (CSI-RS) Resource Indicator (CRI), a strongest layer indication (SLI), a rank indication (RI), and/or the like. L1-RSRP and/or L1-SINR may be used for beam selection based at least in part on interference. In some aspects, the communication manager 334, controller/processor 280, transmit processor 264, and/or the like may manage the transmission of CSI reports by the architecture 300. Some techniques and apparatuses described herein provide for a CSI report to be transmitted in two or more parts, as described in more detail elsewhere herein.

As indicated above, FIG. 3 is provided as an example. Other examples may differ from what is described with regard to FIG. 3.

CSI measurement and reporting may be based at least in part on a CSI report configuration. A CSI report configuration may be semi-statically configured (e.g., using radio resource control (RRC) signaling and/or the like. The CSI report configuration may identify a periodicity for CSI reporting, a reference signal for CSI reporting, a resource associated with CSI reporting, and/or the like. CSI reporting can be performed periodically, semi-persistently, or aperiodically. Aperiodic CSI reporting can be triggered, whereas periodic and semi-persistent CSI reporting can be configured to be performed in accordance with an interval. Semi-persistent CSI reporting may be activated, such as by downlink control information (DCI).

With the implementation of NR, the size of CSI feedback has grown relative to earlier radio access technologies. For example, CSI feedback may carry L1-RSRP and L1-SINR information, which may include information regarding multiple beams and thus may be large in size (e.g., approximately 20 bits, in some aspects). When combined with a periodic CSI report, the larger size of CSI feedback in NR may cause coverage issues and poor throughput. For example, channel conditions at the UE may change faster than a periodic CSI report configuration can be updated (e.g., on a slot to slot basis, in some cases), so the CSI feedback of the CSI report may be unreliable, thereby reducing efficiency of the network and using computing resources associated with retransmitting the CSI feedback. This may be exacerbated for larger CSI reports, such as those including L1-RSRP/L1-SINR information, and for periodic CSI reporting using longer periodicities.

Some techniques and apparatuses described herein provide for a Layer 1 measurement report, such as a CSI report carrying measurement information for a plurality of beams, to be provided in two or more parts. For example, a first part of the Layer 1 measurement report may carry measurement information for a first set of beams and a second part of the Layer 1 measurement report may carry measurement information for a second set of beams different than the first set of beams. The first part and the second part may be transmitted at different times, on different resources, and/or the like. In some aspects, the first part may carry information regarding a best set of beams, and the second part may carry information regarding one or more beams other than the best set of beams.

Furthermore, some techniques and apparatuses described herein provide for the first part and the second part to be transmitted at different periodicities relative to each other and/or to a single-part CSI report. For example, a first part (carrying information for a best set of beams) may be transmitted more frequently than a second part (carrying information regarding one or more beams other than the best set of beams). Thus, reliability of CSI reporting may be improved relative to a single-part CSI report, particularly with regard to a first part that is transmitted more frequently than a single-part CSI report, by reducing the payload size of a given CSI report. Improving reliability of CSI reporting conserves communication resources by reducing the number of CSI reports that must be retransmitted.

Figure 4:
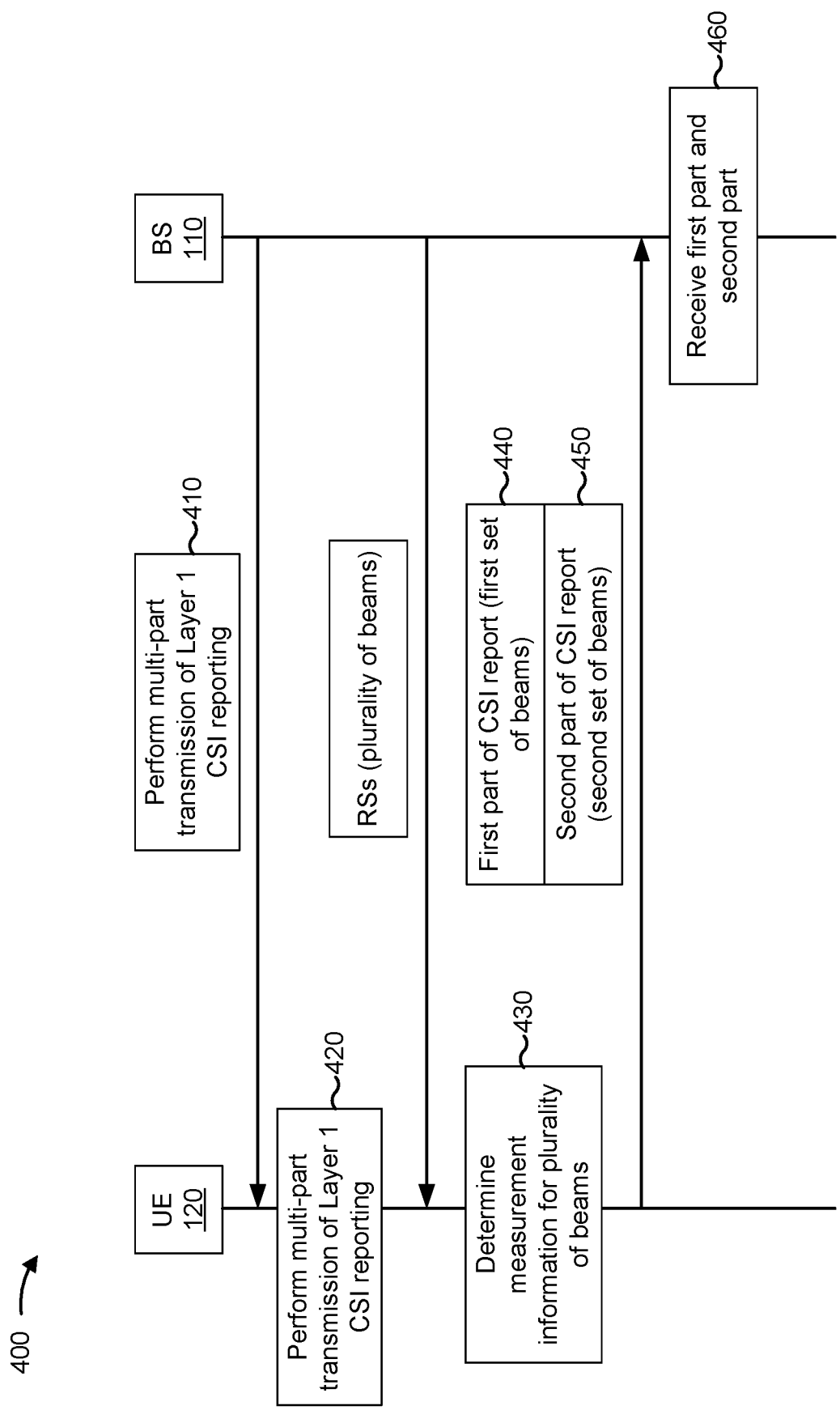
FIG. 4 is a diagram illustrating an example of multi-part Layer 1 reporting, in accordance with the present disclosure.

FIG. 4 is a diagram illustrating an example 400 of multi-part transmission of Layer 1 CSI reporting, in accordance with the present disclosure. As shown, example 400 includes a UE 120 and a BS 110.

As shown by reference number 410, in some aspects, the UE 120 may receive a signal indicating to perform multi-part transmission of Layer 1 CSI reporting. The Layer 1 CSI reporting may be performed using a Layer 1 measurement report, such as a CSI report that carries L1-RSRP information, L1-SINR information, or another form of Layer 1 measurement information. In some aspects, the signal may be provided via DCI, a medium access control (MAC) control element (CE), and/or the like. In this case, the signaling may be referred to as dynamic signaling. In some aspects, the signal may indicate to activate a configuration associated with multi-part transmission of Layer 1 CSI reporting. For example, the signal may indicate a selected configuration of a plurality of configurations or may carry information identifying the configuration.

In some aspects, the signal may comprise semi-static signaling. For example, the BS 110 may provide the signal in association with or as part of a CSI report configuration (e.g., for a periodic CSI report and/or a semi-persistent CSI report), using RRC signaling, and/or the like. In some aspects, the signal may indicate a timer associated with transmission of a Layer 1 measurement report as the first part and the second part. For example, the signal may indicate an expiration time or a timer length associated with the multi-part transmission of the Layer 1 measurement report. As another example, the timer may be pre-configured for the UE 120 (e.g., as part of a wireless communication specification, as part of a CSI report configuration, and/or the like). In some aspects, the CSI report configuration may indicate one or more parameters for CSI reporting, such as a periodicity for CSI reporting, a trigger for CSI reporting, a wideband or subband configuration, one or more reference signals associated with the CSI reporting, a resource associated with CSI reporting, or the like.

As shown by reference number 420, the UE 120 may determine to perform multi-part transmission of Layer 1 CSI reporting. If the UE 120 receives the signal shown by reference number 410, then the UE 120 may determine to perform multi-part transmission of the Layer 1 CSI reporting in accordance with the signal shown by reference number 410. In some aspects, the UE 120 may determine to perform multi-part transmission of Layer 1 CSI reporting without having received the signal shown by reference number 410. For example, the UE 120 may perform this determination based at least in part on a measurement performed by the UE 120 (e.g., regarding channel conditions at the UE 120 and/or the like). In this case, the UE 120 may provide a signal (e.g., via uplink control information (UCI), a reference signal, the first part of the CSI feedback, and/or the like) indicating that the UE 120 is to perform multi-part transmission of the Layer 1 CSI reporting (not shown in FIG. 4).

As shown by reference number 430, the UE 120 may determine CSI feedback for a plurality of beams, including a first set of beams and a second set of beams, based at least in part on one or more reference signals received from the BS 110. For example, the UE 120 may determine measurement information (e.g., an L1-SINR, an L1-RSRP, and/or the like) for the plurality of beams. In some aspects, the UE 120 may assign beams to the first set of beams or the second set of beams based at least in part on the CSI feedback. For example, the UE 120 may assign a best N beams (where N is greater than or equal to 1) to the first set of beams, and may assign one or more remaining beams, of the plurality of beams, to the second set of beams. As used herein, a best beam, of a group of beams, refers to a beam associated with a highest measurement value relative to the group of beams, such as a highest SINR value, a highest RSRP value, and/or the like.

As shown by reference number 440, the UE 120 may transmit a first part of a CSI report. As shown by reference number 450, the UE 120 may transmit a second part of the CSI report using different time and/or frequency (T/F) resources than the first part of the CSI report. As shown, the first part may include measurement information for the first set of beams, and the second part may include measurement information for the second set of beams. As shown by reference number 460, the BS 110 may receive the first part and the second part. In some aspects, the UE 120 may transmit more than two parts. For example, the UE 120 may divide the measurement information over three or more parts, which further reduces the size of each payload relative to a two-part approach. The two-part approach may involve less overhead than the three-or-more-part approach. Thus, the CSI report is divided into two or more parts, which reduces the payload size of any given part, thereby increasing reliability of CSI transmission.

In some aspects, the UE 120 may transmit the first part and the second part with different periodicities. For example, the UE 120 may transmit the first part more frequently than the second part, which conserves communication resources that would otherwise be used to provide the second part (which may carry information for one or more suboptimal beams) equally as often as the first part. In some aspects, the UE 120 may transmit the first part and/or the second part with a different periodicity than a single-part CSI report. For example, the UE 120 may transmit the multi-part CSI report less frequently than the single-part CSI report, thereby conserving communication resources that would otherwise be used to transmit the multi-part CSI more frequently.

In some aspects, the first part and the second part may include respective standalone CSI reports. In some aspects, the first part and the second part may include respective partial CSI reports. In some aspects, measurement information in the second part may be defined relative to measurement information in the first part. For example, the measurement information in the second part may be indicated by an offset relative to the measurement information in the first part, which reduces size of the second part. In some aspects, the second part may include measurement information that is not defined relative to measurement information in the first part (e.g., standalone measurement information), which reduces reliance on successful transmission of the first part.

As indicated above, FIG. 4 is provided as an example. Other examples may differ from what is described with respect to FIG. 4.

Figure 5:
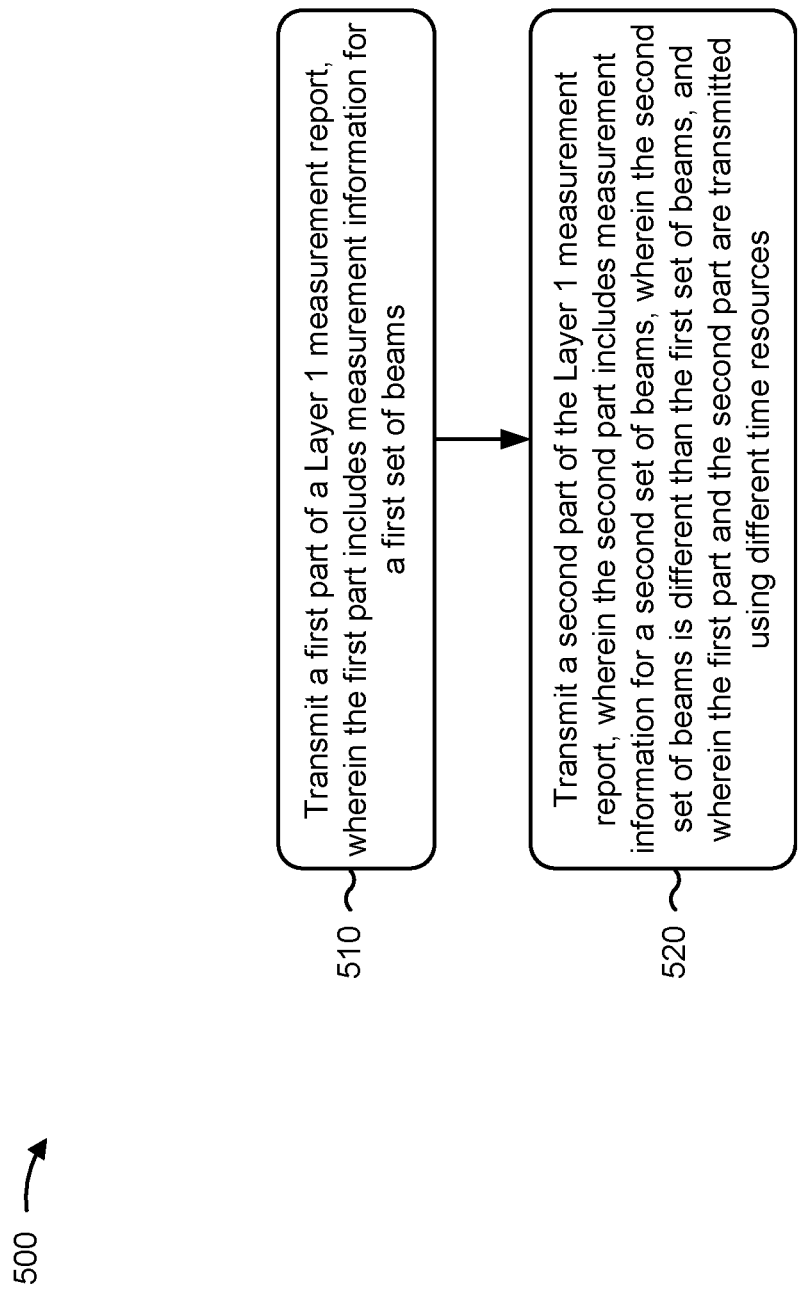
FIG. 5 is a diagram illustrating an example process performed, for example, by a user equipment, in accordance with the present disclosure.

FIG. 5 is a diagram illustrating an example process 500 performed, for example, by a UE, in accordance with the present disclosure. Example process 500 is an example where the UE (e.g., UE 120 and/or the like) performs operations associated with multi-part Layer 1 reporting.

As shown in FIG. 5, in some aspects, process 500 may include transmitting a first part of a Layer 1 measurement report, wherein the first part includes measurement information for a first set of beams (block 510). For example, the UE (e.g., using controller/processor 280, transmit processor 264, TX MIMO processor 266, MOD 254, antenna 252, and/or the like) may transmit a first part of a Layer 1 measurement report, as described above. In some aspects, the first part includes measurement information for a first set of beams.

As further shown in FIG. 5, in some aspects, process 500 may include transmitting a second part of the Layer 1 measurement report, wherein the second part includes measurement information for a second set of beams, wherein the second set of beams is different than the first set of beams, and wherein the first part and the second part are transmitted using different time resources (block 520). For example, the UE (e.g., using controller/processor 280, transmit processor 264, TX MIMO processor 266, MOD 254, antenna 252, and/or the like) may transmit a second part of the Layer 1 measurement report, as described above. In some aspects, the second part includes measurement information for a second set of beams. In some aspects, the second set of beams is different than the first set of beams. In some aspects, the first part and the second part are transmitted using different time resources.

Process 500 may include additional aspects, such as any single aspect or any combination of aspects described below and/or in connection with one or more other processes described elsewhere herein.

In a first aspect, the first set of beams includes one or more best beams, of a plurality of measured beams, based at least in part on measurements associated with the plurality of measured beams.

In a second aspect, alone or in combination with the first aspect, the first part is transmitted using a first periodicity and the second part is transmitted using a second periodicity different than the first periodicity.

In a third aspect, alone or in combination with one or more of the first and second aspects, the first part is transmitted more frequently than the second part, based at least in part on the first periodicity and the second periodicity.

In a fourth aspect, alone or in combination with one or more of the first through third aspects, transmitting the first part and transmitting the second part are based at least in part on a first periodicity, wherein the first periodicity is different than a second periodicity associated with transmitting a one-part Layer 1 measurement report.

In a fifth aspect, alone or in combination with one or more of the first through fourth aspects, the first periodicity is shorter than the second periodicity.

In a sixth aspect, alone or in combination with one or more of the first through fifth aspects, process 500 includes receiving signaling indicating that the Layer 1 measurement report is to be transmitted as the first part and the second part, wherein transmitting the first part and transmitting the second part are based at least in part on the signaling.

In a seventh aspect, alone or in combination with one or more of the first through sixth aspects, the signaling comprises downlink control information or medium access control signaling.

In an eighth aspect, alone or in combination with one or more of the first through seventh aspects, the signaling indicates a configuration associated with a semi-persistent or periodic report, and the configuration indicates that the Layer 1 measurement report is to be transmitted as the first part and the second part.

In a ninth aspect, alone or in combination with one or more of the first through eighth aspects, the signaling comprises configuration information for channel state information reporting.

In a tenth aspect, alone or in combination with one or more of the first through ninth aspects, the configuration information is associated with periodic or semi-persistent channel state information reporting.

In an eleventh aspect, alone or in combination with one or more of the first through tenth aspects, the signaling indicates a timer associated with transmission of the Layer 1 measurement report as the first part and the second part.

In a twelfth aspect, alone or in combination with one or more of the first through eleventh aspects, process 500 includes determining that the Layer 1 measurement report is to be transmitted as the first part and the second part, wherein transmitting the first part and transmitting the second part are based at least in part on the determination.

In a thirteenth aspect, alone or in combination with one or more of the first through twelfth aspects, the determination is based at least in part on one or more measurements associated with the Layer 1 measurement report.

In a fourteenth aspect, alone or in combination with one or more of the first through thirteenth aspects, process 500 includes transmitting information indicating that the Layer 1 measurement report is to be transmitted as the first part and the second part.

In a fifteenth aspect, alone or in combination with one or more of the first through fourteenth aspects, the transmitted information indicates a timer associated with transmission of the Layer 1 measurement report as the first part and the second part.

In a sixteenth aspect, alone or in combination with one or more of the first through fifteenth aspects, process 500 includes transmitting a third part of the Layer 1 measurement report, wherein the third part includes measurement information for a third set of beams different than the first set of beams and the second set of beams.

In a seventeenth aspect, alone or in combination with one or more of the first through sixteenth aspects, the Layer 1 measurement report is based at least in part on at least one of: a Layer 1 signal to interference plus noise measurement, or a Layer 1 reference signal received power measurement.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
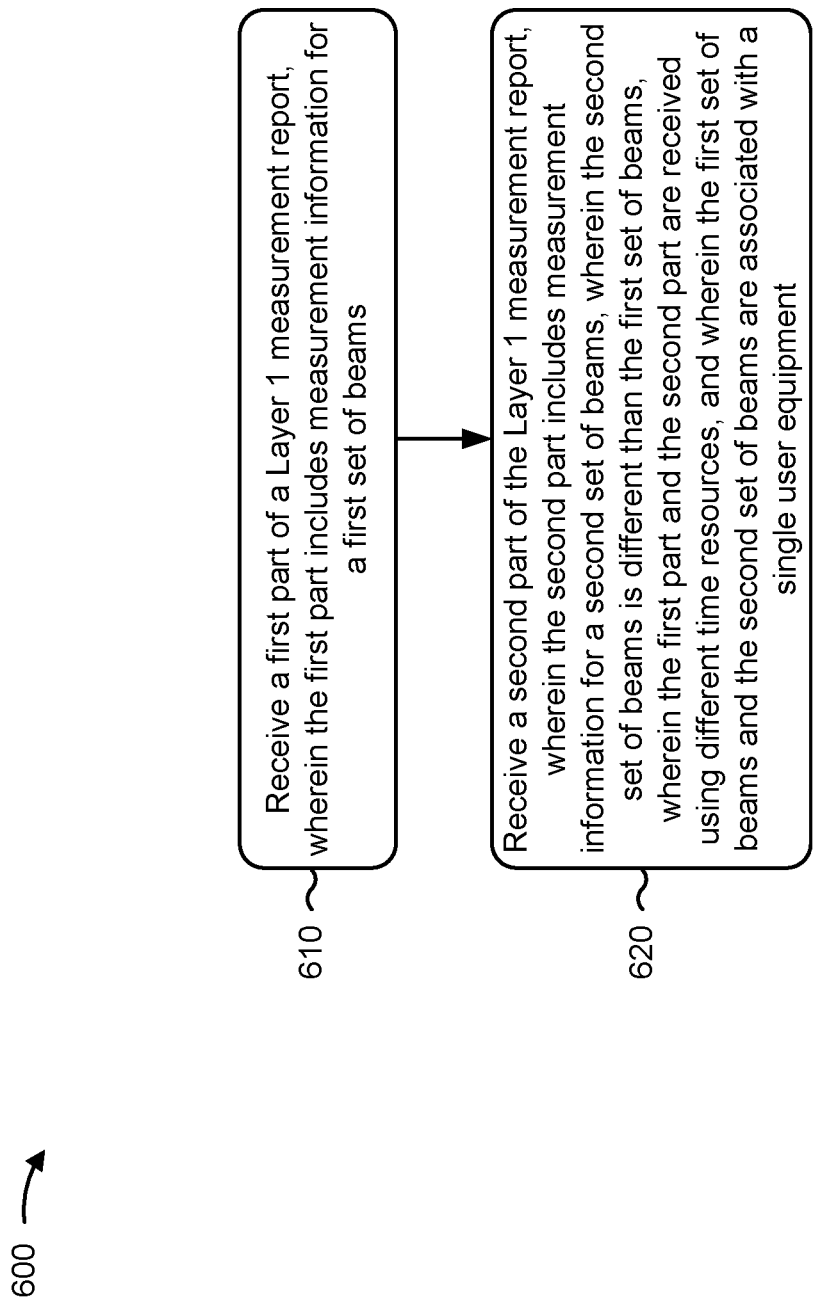
FIG. 6 is a diagram illustrating an example process performed, for example, by a base station, in accordance with the present disclosure.

FIG. 6 is a diagram illustrating an example process 600 performed, for example, by a base station, in accordance with the present disclosure. Example process 600 is an example where the base station (e.g., base station 110 and/or the like) performs operations associated with multi-part Layer 1 reporting.

As shown in FIG. 6, in some aspects, process 600 may include receiving a first part of a Layer 1 measurement report, wherein the first part includes measurement information for a first set of beams (block 610). For example, the base station (e.g., using antenna 234, DEMOD 232, MIMO detector 236, receive processor 238, controller/processor 240, and/or the like) may receive a first part of a Layer 1 measurement report, as described above. In some aspects, the first part includes measurement information for a first set of beams.

As further shown in FIG. 6, in some aspects, process 600 may include receiving a second part of the Layer 1 measurement report, wherein the second part includes measurement information for a second set of beams, wherein the second set of beams is different than the first set of beams, wherein the first part and the second part are received using different time resources, and wherein the first set of beams and the second set of beams are associated with a single UE (block 620). For example, the base station (e.g., using antenna 234, DEMOD 232, MIMO detector 236, receive processor 238, controller/processor 240, and/or the like) may receive a second part of the Layer 1 measurement report, as described above. In some aspects, the second part includes measurement information for a second set of beams. In some aspects, the second set of beams is different than the first set of beams. In some aspects, the first part and the second part are received using different time resources. In some aspects, the first set of beams and the second set of beams are associated with a single UE. For example, the first set of beams and the second set of beams may be generated by the UE and/or may be used for communication with the UE.

Process 600 may include additional aspects, such as any single aspect or any combination of aspects described below and/or in connection with one or more other processes described elsewhere herein.

In a first aspect, the first set of beams includes one or more best beams, of a plurality of measured beams, based at least in part on measurements associated with the plurality of measured beams.

In a second aspect, alone or in combination with the first aspect, the first part is received based at least in part on a first periodicity and the second part is received based at least in part on a second periodicity different than the first periodicity.

In a third aspect, alone or in combination with one or more of the first and second aspects, the first part is received more frequently than the second part based at least in part on the first periodicity and the second periodicity.

In a fourth aspect, alone or in combination with one or more of the first through third aspects, receiving the first part and receiving the second part are based at least in part on a first periodicity, wherein the first periodicity is different than a second periodicity associated with receiving a one-part Layer 1 measurement report.

In a fifth aspect, alone or in combination with one or more of the first through fourth aspects, the first part and the second part are received less frequently than the one-part Layer 1 measurement report. For example, the first periodicity may be shorter than the second periodicity.

In a sixth aspect, alone or in combination with one or more of the first through fifth aspects, process 600 includes transmitting signaling indicating that the Layer 1 measurement report is to be transmitted as the first part and the second part, wherein receiving the first part and receiving the second part are based at least in part on the signaling.

In a seventh aspect, alone or in combination with one or more of the first through sixth aspects, the signaling comprises downlink control information or medium access control signaling.

In an eighth aspect, alone or in combination with one or more of the first through seventh aspects, the signaling indicates a configuration associated with a semi-persistent or periodic report, and the configuration indicates that the Layer 1 measurement report is to be transmitted as the first part and the second part.

In a ninth aspect, alone or in combination with one or more of the first through eighth aspects, the signaling comprises configuration information for channel state information reporting.

In a tenth aspect, alone or in combination with one or more of the first through ninth aspects, the configuration information is associated with periodic or semi-persistent channel state information reporting.

In an eleventh aspect, alone or in combination with one or more of the first through tenth aspects, the signaling indicates a timer associated with transmission of the Layer 1 measurement report as the first part and the second part.

In a twelfth aspect, alone or in combination with one or more of the first through eleventh aspects, process 600 includes receiving information indicating that the Layer 1 measurement report is to be transmitted as the first part and the second part.

In a thirteenth aspect, alone or in combination with one or more of the first through twelfth aspects, the information indicating that the Layer 1 measurement report is to be received as the first part and the second part indicates a timer associated with transmission of the Layer 1 measurement report as the first part and the second part.

In a fourteenth aspect, alone or in combination with one or more of the first through thirteenth aspects, process 600 includes receiving a third part of the Layer 1 measurement report, wherein the third part includes measurement information for a third set of beams different than the first set of beams and the second set of beams.

In a fifteenth aspect, alone or in combination with one or more of the first through fourteenth aspects, the Layer 1 measurement report is based at least in part on at least one of: a Layer 1 signal to interference plus noise measurement, or a Layer 1 reference signal received power measurement.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The reliability of a CSI report (especially when reporting L1-RSRP measurement(s) and L1-SINR measurement(s)) may be important for beam reliability. Increased beam reliability may facilitate increased unicast coverage area in the frequency range 2 (FR2). The CSI report in NR includes one or more of the CQI, the PMI, a CSI-RS resource indicator (CRI), a strongest layer indication (SLI), the RI, the L1-RSRP, and the L1-SINR. The L1-RSRP and the L1-SINR components of the CSI report may be important for the beam management process. The L1-RSRP report or the L1-SINR report can be large (e.g., about 20 bits), which may result in reduced coverage area of the PUCCH that carries the report. There may be three different types of CSI reporting: periodic, semi-persistent, and aperiodic. Periodic CSI reporting may be carried on PUCCH with PUCCH formats 0 and 2, which is often referred to as a short PUCCH, or PUCCH formats 1, 3 and 4, which is often referred to as a long PUCCH. Semi-persistent CSI reporting may be carried on the long PUCCH or the PUSCH. Resources/MCS for the semi-persistent CSI reporting on the PUSCH are allocated semi-persistently using the DCI. The semi-persistent CSI reporting may support Type II CSI with a minimum periodicity of 5 ms. The semi-persistent CSI reporting is not supported for an aperiodic CSI-RS. However, this does not preclude one CSI report being carried by multiple UL reporting instances. The periodic CSI reporting or the semi-persistent CSI reporting may support the following channel periodicities: 5, 10, 20, 40, 80, 160, and 320 slots. Aperiodic CSI reporting may be carried on the PUSCH multiplexed with or without uplink data.

During the beam selection process, the L1-SINR value may be measured for multiple beams considering interference, and a L1-SINR report may be generated using a similar format as the L1-RSRP report. For example, up to 4 beams can be reported per configured L1-SINR report. Among the multiple beams, a beam with the highest L1-SINR value may be selected as the 1st reported beam or the best beam, and an absolute L1-SINR value may be reported for the 1st reported beam or the 1st reported beam. A differential SINR value may be reported for each of the remaining beam(s) being reported, if any, where the differential SINR is computed with respect to the L1-SINR value of the 1st reported beam. A CSI report reporting the L1-RSRP measurement and/or the L1-SINR measurement for 4 beams may have the following structure.

| CSI report number | CSI fields |
| --- | --- |
| CSI report #n (or a serial number) | CRI or SS/PBCH resource block indicator (SSBRI) #1, if reported<br>CRI or SSBRI #2, if reported<br>CRI or SSBRI #3, if reported<br>CRI or SSBRI #4, if reported<br>SINR #1, if reported<br>Differential SINR #2, if reported<br>Differential SINR #3, if reported<br>Differential SINR #4, if reported |

Given the increased size and complexity of CSI reporting, a coverage area of the channel that carries the CSI report may be degraded relative to transmission of simpler CSI reporting. If the CSI reporting coverage area is poor, the reliability of beam management for unicast channels may be poor. Techniques and apparatuses described herein (above and below) improve the reliability of beam management for the unicast channels by improving the coverage area of CSI reporting.

Figure 7:
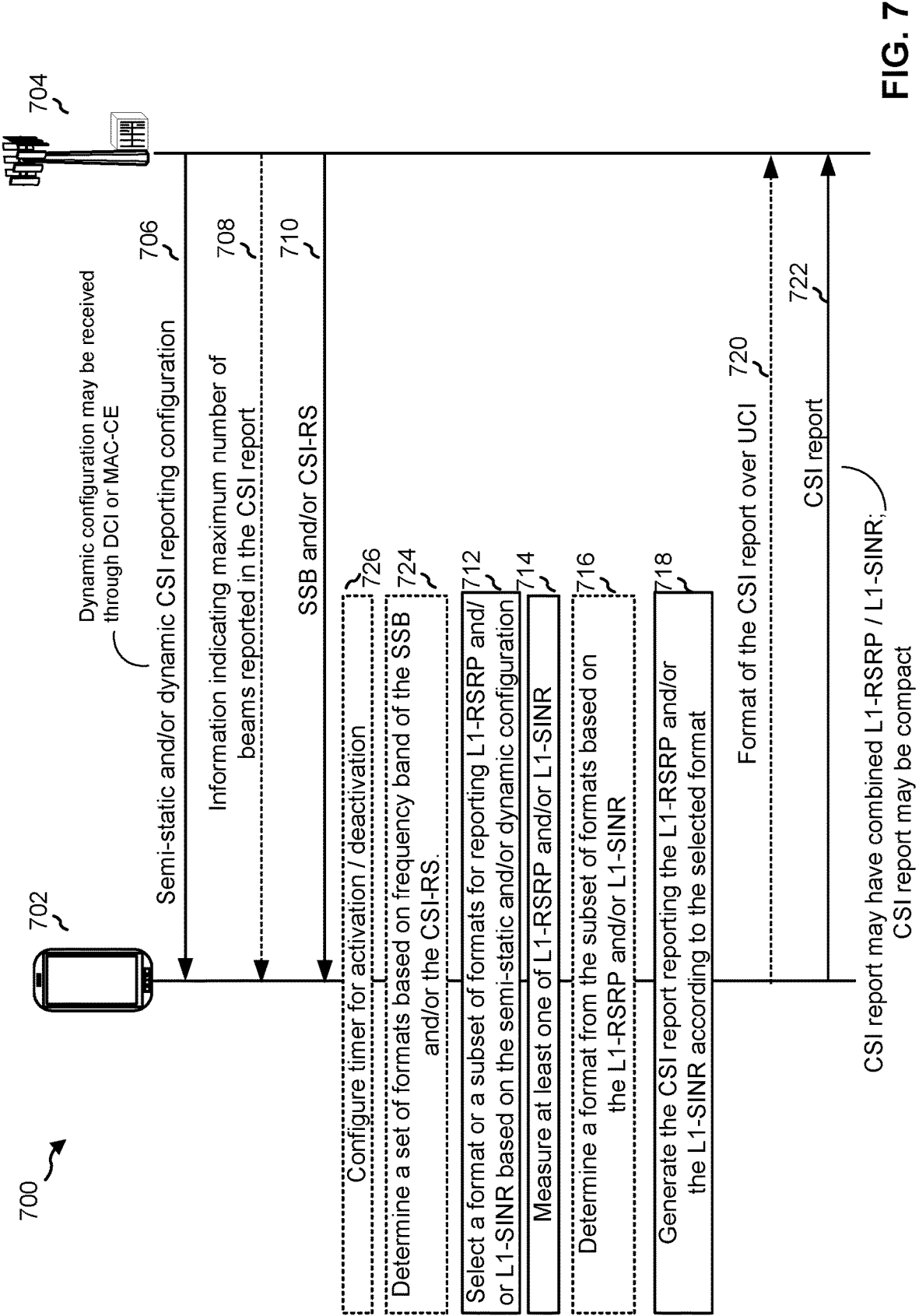
FIG. 7 is a call flow diagram illustrating a method of generating and reporting a CSI report, which includes setting an alternative format for reporting the L1-RSRP measurement or the L1-SINR measurement, in accordance with the present disclosure.

FIG. 7 is a call flow diagram 700 illustrating a method of generating and reporting a CSI report, which includes setting an alternative format for reporting the L1-RSRP measurement or the L1-SINR measurement, in accordance with the present disclosure.

As illustrated in FIG. 7, a UE 702 (e.g., UE 120) receives a semi-static and/or a dynamic CSI reporting configuration 706 from a base station 704 (e.g., BS 110). The UE 702 receives a synchronization signal block (SSB) and/or a CSI reference signal (RS) (CSI-RS) 710 from the base station 704. The UE 702 may select a format or a subset of formats from a set of formats for reporting the L1-RSRP measurement and/or the L1-SINR measurement 712. Based at least in part on receiving the SSB or the CSI-RS from the base station 704, the UE 702 may measure the L1-RSRP value and/or the L1-SINR value 714 for multiple beams, and generate the CSI report reporting the L1-RSRP measurement and/or the L1-SINR measurement according to the selected format 718. The UE 702 may transmit the CSI report 722 to the base station 704. The CSI report may be one of a periodic CSI report or a semi-persistent CSI report.

The UE 702 may generate CSI report including the L1-RSRP measurement and/or the L1-SINR measurement for the 1st reported beam and at least one of a differential L1-RSRP value or a differential L1-SINR value for other beams. The CSI report generated by the UE 702 may include an alternative (such as compact) format for reporting the L1-RSRP (and/or the L1-SINR) and/or a combined report, where a smaller payload (compared to the default format) may be used for the CSI report. That is, the CSI report generated by the UE 702 according to the alternative format for reporting the L1-RERP measurement and/or the L1-SINR measurement may require less resources to transmit compared to a CSI report with a different format. Also, the compact CSI report for reporting the L1-RSRP measurement and/or the L1-SINR measurement may include a smaller bitfield size for the L1-RSRP measurement and/or the L1-SINR measurement of the reported beams (such as a smaller number of bits for reporting the RSRP measurement and/or the SINR measurement of the 1st reported beam and the differential RSRP value and/or the differential SINR value of the other beams), compared to the default report. That is, the CSI report generated according to the selected format may have a size different from a CSI report generated according to other formats. More particularly, the CSI report generated according to the selected format may be more compact in size than a CSI report generated according to other formats.

In some aspects, the CSI report generated according to the selected format from the set of formats may include a CSI field with a smaller bitfield size for reporting the L1-RSRP measurement and/or the L1-SINR measurement. For example, the CSI report generated according to the selected format may include a CSI field with a bitfield size for the L1-RSRP and/or the L1-SINR smaller than a bitfield size of a corresponding CSI field of a CSI report generated according to a format other than the selected format. Particularly, the CSI report generated according to the selected format may include a CSI field with a bitfield size for the L1-RSRP and/or the L1-SINR of less than 7 bits. Accordingly, the CSI report generated according to the selected format may be more compact in size and improve the coverage area of the channel that carries the CSI report, increasing the reliability of the beam management process.

In some aspects, a compact L1-RSRP and/or a compact L1-SINR may be associated with a smaller number of beams, compared to the default report. That is, the UE 702 may generate the CSI report reporting the L1-RSRP measurement and/or the L1-SINR measurement for a predetermined maximum number of beams. For example, the UE 702 may generate the CSI report including the L1-RSRP measurement and/or the L1-SINR measurement for a maximum number of (for example) one, two, or three beams. In some aspects, the predetermined maximum number of beams to be included in the CSI may be a fixed number of beams.

In some aspects, the UE 702 may receive, from the base station 704, information indicating a maximum number of beams to be reported in the CSI report 708. The UE 702 then may generate the CSI report including the L1-RSRP measurement and/or the L1-SINR measurement for a number of beams equal to or less than the maximum number of beams indicated in the information received from the base station 704. Accordingly, the maximum number of beams reported in the CSI report may be regulated to manage the overall size of the CSI report, and therefore, the channel that carries the CSI report may have an improved coverage area, increasing the reliability of the beam management process.

In some aspects, the compact CSI report may combine the report of the L1-RSRP measurement and/or the L1-SINR measurement. That is, the UE 702 may generate the CSI report to include the L1-RSRP measurements and/or the L1-SINR measurements in a combined format. Particularly, the CSI report generated according to the selected format from the set of formats may include the L1-RSRP measurement and/or the L1-SINR measurement in a combined format. Accordingly, the CSI report generated by the UE 702 may include the L1-RSRP measurement and/or the L1-SINR measurement in a more compact format, and therefore, the channel that carries the CSI report may have an improved coverage area, increasing the reliability of the beam management process.

In some aspects, the format of the compact CSI report for reporting L1-RSRP measurement and/or the L1-SINR measurement, or the CSI reporting including the combined reporting of the L1-RSRP measurement and/or L1-SINR measurement may be uniquely predefined. Also, the formats of the CSI report may include multiple options of formats from which a format of CSI may be chosen by configuration and/or dynamic signaling. That is, the format of the CSI report for reporting the L1-RSRP measurement and/or the L1-SINR measurement may be uniquely predefined, or may be a set of formats from which the UE 702 may select a format based at least in part on the configuration and/or the dynamic signaling of the configuration.

In some aspects, the list of options for the format for reporting the L1-RSRP measurement and/or L1-SINR measurement may depend on the frequency range or frequency band of the SSB and/or the CSI-RS. That is, the UE 702 may determine a set of formats based at least in part on attributes of the received the SSB and/or the CSI-RS. For example, the set of formats may be determined based at least in part on a frequency range or frequency band associated with the received the SSB and/or the CSI-RS 724. Accordingly, the UE 702 may improve the coverage area of the channel that carries the CSI report by selecting the format of the CSI report more applicable to the attributes of the SSB and/or the CSI-RS received from the base station 704, which may increase the reliability of the beam management process.

In some aspects, the generation of the compact L1-RSRP and/or the compact L1-SINR may be activated dynamically by the gNB 180 or the base station 704 via the DCI or a MAC control element (CE) (MAC-CE). That is, the UE 702 may dynamically select the format for the CSI report in response to receiving the DCI and/or the MAC-CE from the base station 704, which may dynamically activate or instruct the UE 702 to generate the CSI report including the compact L1-RSRP and/or the compact L1-SINR.

In some aspects, the generation of the compact L1-RSRP and/or the compact L1-SINR may be activated semi-statically during configuration of the CSI report setting (e.g., the setting for a periodic CSI report and/or semi-persistent CSI report). That is, the UE 702 may semi-statically receive the configuration of a CSI report setting, which may activate or instruct the UE 702 to generate the CSI report including the compact format of the L1-RSRP measurement and/or the L1-SINR measurement semi-statically.

In some aspects, the generation of the compact L1-RSRP and/or the compact L1-SINR may be triggered by the UE 702 based at least in part on measurements made by the UE 702, and the trigger may be indicated back to the base station 704 via UCI. That is, the UE 702 may select a format for reporting the L1-RSRP measurement and/or the L1-SINR measurement based at least in part on the measured L1-RSRP value and/or measured L1-SINR value, and indicate the selected format and the details of the selected format to the base station 704. Also, in case a subset of formats is selected from a set of formats for reporting the L1-RSRP measurement and/or the L1-SINR measurement according to the semi-static and/or the dynamic configuration received from the base station 704, the UE 702 may determine a format from the subset of formats based at least in part on the measured L1-RSRP value and/or the measured L1-SINR value 716. Accordingly, the UE 702 may analyze the environment of the wireless network 100 illustrated in FIG. 1 based at least in part on the L1-RSRP measurement and/or the L1-SINR measurement, and improve the coverage area of the channel that carries the CSI report by generating the CSI report in a format that is better applicable to the analyzed environment of the wireless communications system and the wireless network 100, increasing the reliability of the beam management process.

In some aspects, the compact CSI report for reporting the L1-RSRP measurement and/or the L1-SINR measurement may be activated/deactivated or activated with expiration 726. Expiration may be configured via an expiry timer that may be preconfigured or configured based at least in part on DCI and/or UCI. That is, the UE 702 may configure a timer for activation and/or deactivation of the generation of the CSI report according to the selected format 718, and the generation of the CSI report according to the selected format may further be activated or deactivated based at least in part on the timer. Particularly, the generation of the CSI report according to the selected format may be activated or deactivated based at least in part on a preconfigured timer. Furthermore, the generation of the CSI report according to the selected format may be activated or deactivated based at least in part on a timer set by the DCI or the UCI.

In some aspects, the UE 702 may transmit information indicating the format of the CSI report 720 to the base station 704 in the UCI. The UE 702 may transmit the information indicating the format of the CSI report 720 to the base station 704 before the transmission of the CSI report 722 to the base station 704. In another configuration, the UE 702 may transmit the information indicating the format of the CSI report 720 to the base station 704 concurrently with the transmission of the CSI report 722 to the base station 704.

Figure 8:
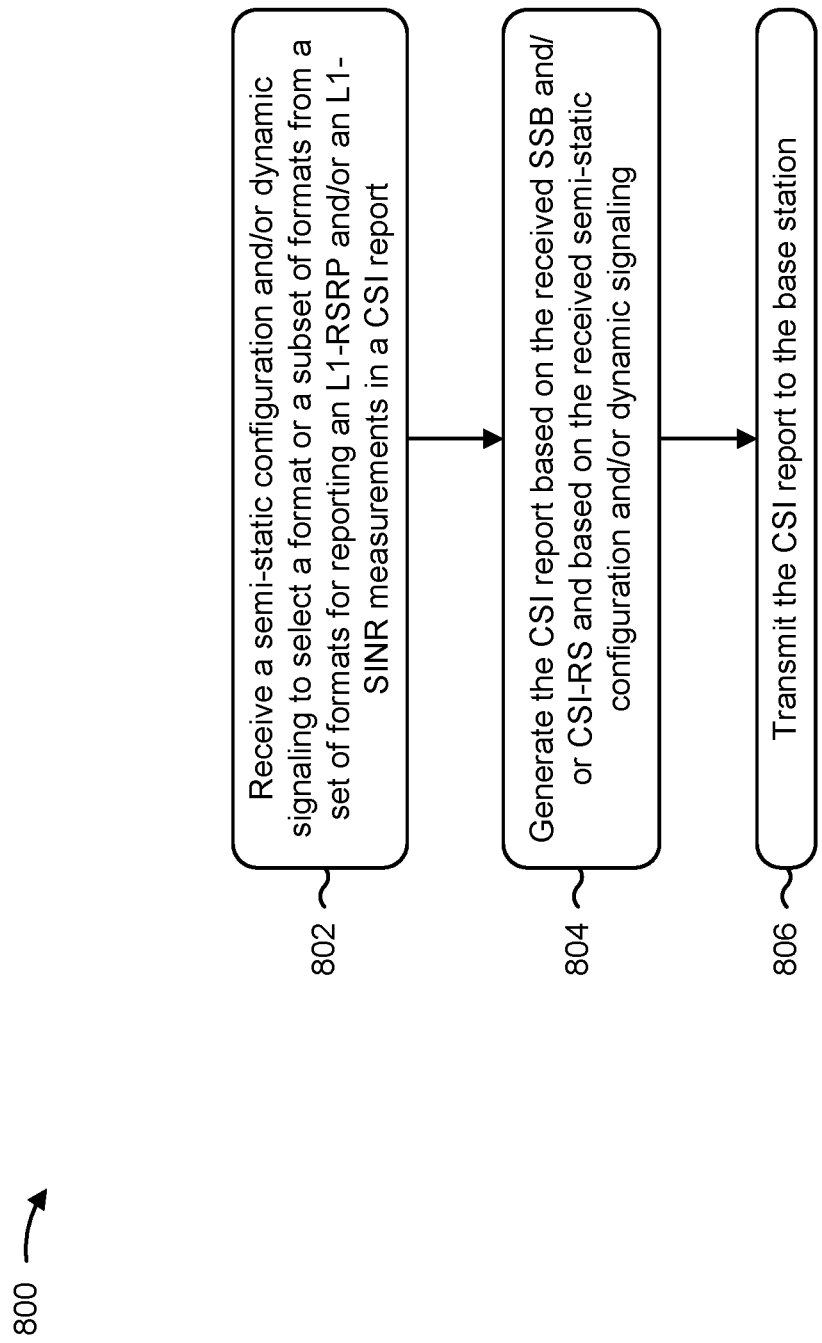
FIG. 8 is a flowchart of a method of a wireless communication, in accordance with the present disclosure.

FIG. 8 is a flowchart 800 of a method of a wireless communication, in accordance with the present disclosure. The method may be performed by a device of the UE 702. The device may be a processor/modem of the UE 702 or the UE 702 itself. The device may also be herein referred to as the UE 702.

At 802, the UE 702 may receive, from the base station 704, the semi-static and/or the dynamic CSI reporting for selecting a format or a subset of formats from a set of formats for reporting the L1-RSRP measurement and/or the L1-SINR measurement in a CSI report. For example, referring to FIG. 7, the UE 702 may receive the semi-static and/or the dynamic configuration 706 from the base station 704, and select a format or a subset of formats from a set of formats of CSI report for reporting the L1-RSRP measurement and/or the L1-SINR measurement 712. In some aspects, the semi-static CSI reporting configuration may be received through a configuration of a CSI report setting, and the dynamic signaling may be received through the DCI and/or the MAC-CE.

At 804, the UE 702 may generate the CSI report based at least in part on the received SSB or the received CSI-RS and based at least in part on the received the semi-static and/or the dynamic CSI reporting configuration. Particularly, the UE 702 may generate the CSI report based at least in part on the received SSB or the received CSI-RS and according to the format selected based at least in part on the received semi-static configuration and/or the received dynamic signaling.

In some aspects, referring to FIG. 7, the UE 702 may receive the SSB and/or the CSI-RS 710 from the base station 704. Upon receiving the SSB or the CSI-RS, the UE 702 may measure the L1-RSRP values and/or the L1-SINR values of multiple beams detected 714, and generate the CSI report reporting the L1-RSRP measurement and/or the L1-SINR measurement according to the selected format 718.

In some aspects, referring back to FIG. 7, when a subset of formats is selected from a set of formats for reporting the L1-RSRP measurement and/or the L1-SINR measurement according to the semi-static and/or the dynamic CSI report configuration received from the base station 704, the UE 702 may determine select a format from the subset of formats of the CSI report based at least in part on the measured L1-RSRP value and/or the L1-SINR value 716.

At 806, the UE 702 may transmit the generated CSI report to the base station 704. Referring to FIG. 7, The UE 702 may transmit the CSI report 722 to the base station 704. The CSI report may be one of a periodic CSI report or a semi-persistent CSI report. In some aspects, referring to FIG. 7, the UE 702 may transmit information indicating the format of the CSI report 720 to the base station 704 before or concurrently with transmitting the CSI report 722 to the base station 704.

Referring again to FIGS. 7 and 8, as discussed above, the UE 702 configured for 8G NR may generate a CSI report including the L1-RSRP measurement or the L1-SINR measurement for beam management process. However, the size of the CSI report reporting the L1-RSRP measurement or the L1-SINR measurement may affect the coverage area of the channel that carries the CSI report and the reliability of the beam management process. In order to improve the coverage area of the channel that carries the CSI report and increase the reliability of the beam management process, the UE 702 may generate the CSI report including an alternative format for reporting the L1-RSRP measurement and/or the L1-SINR measurement. Particularly, the UE 702 may receive the semi-static and/or the dynamic configuration 706 and the SSB and/or the CSI-RS 710 from the base station 704. The UE 702 may select a format from a set of formats for reporting the L1-RSRP measurement and/or the L1-SINR measurement 712 based at least in part on the CSI reporting configuration received from the base station 704, and measure the L1-RSRP value and/or the L1-SINR value 714 in response to the SSB and/or the CSI-RS received from the base station 704 to generate the CSI report reporting the L1-RSRP measurement and/or the L1-SINR measurement with the selected format 718. The CSI report may include the absolute value of the L1-RSRP measurement and/or the L1-SINR measurement for a first reported beam and a differential L1-RSRP value and/or a differential L1-SINR value for other beams. The CSI report may have a compact (or an alternative) size different from (or smaller than) a CSI report generated according to other formats. Particularly, the CSI report generated according to the selected format may include a CSI field with a bitfield size for reporting the L1-RSRP measurement and/or the L1-SINR measurement which is smaller than a bitfield size of a corresponding CSI field of a CSI report generated according to a format other than the selected format. For example, the CSI report may include a bitfield size of less than 7 bits for reporting the L1-RSRP measurement and/or the L1-SINR measurement. Also, the CSI report may also include the L1-RSRP measurement and/or the L1-SINR measurement in a combined format. Accordingly, the UE 702 may improve the coverage area of the channel that carries the CSI report and increase the reliability of the beam management process.

As indicated above, FIGS. 7 and 8 are provided as examples. Other examples may differ from what is described with regard to FIGS. 7 and 8.

The following provides an overview of some Aspects of the present disclosure:

Aspect 1: A method of wireless communication performed by a user equipment (UE), comprising: transmitting a first part of a Layer 1 measurement report, wherein the first part includes measurement information for a first set of beams; and transmitting a second part of the Layer 1 measurement report, wherein the second part includes measurement information for a second set of beams, wherein the second set of beams is different than the first set of beams, and wherein the first part and the second part are transmitted using different time resources.

Aspect 2: The method of Aspect 1, wherein the first set of beams includes one or more best beams, of a plurality of measured beams, based at least in part on measurements associated with the plurality of measured beams.

Aspect 3: The method of any of Aspects 1-2, wherein the first part is transmitted using a first periodicity and the second part is transmitted using a second periodicity different than the first periodicity.

Aspect 4: The method of Aspect 3, wherein the first part is transmitted more frequently than the second part based at least in part on the first periodicity and the second periodicity.

Aspect 5: The method of any of Aspects 1-4, wherein transmitting the first part and transmitting the second part are based at least in part on a first periodicity, wherein the first periodicity is different than a second periodicity associated with transmitting a one-part Layer 1 measurement report.

Aspect 6: The method of Aspect 5, wherein the first periodicity is shorter than the second periodicity.

Aspect 7: The method of any of Aspects 1-6, further comprising: receiving signaling indicating that the Layer 1 measurement report is to be transmitted as the first part and the second part, wherein transmitting the first part and transmitting the second part are based at least in part on the signaling.

Aspect 8: The method of Aspect 7, wherein the signaling comprises downlink control information or medium access control signaling.

Aspect 9: The method of Aspect 8, wherein the signaling indicates a configuration associated with a semi-persistent or periodic report, wherein the configuration indicates that the Layer 1 measurement report is to be transmitted as the first part and the second part.

Aspect 10: The method of Aspect 7, wherein the signaling comprises configuration information for channel state information reporting.

Aspect 11: The method of Aspect 10, wherein the configuration information is associated with periodic or semi-persistent channel state information reporting.

Aspect 12: The method of Aspect 7, wherein the signaling indicates a timer associated with transmission of the Layer 1 measurement report as the first part and the second part.

Aspect 13: The method of any of Aspects 1-12, further comprising: determining that the Layer 1 measurement report is to be transmitted as the first part and the second part, wherein transmitting the first part and transmitting the second part are based at least in part on the determination.

Aspect 14: The method of Aspect 13, wherein the determination is based at least in part on one or more measurements associated with the Layer 1 measurement report.

Aspect 15: The method of Aspect 13, further comprising: transmitting information indicating that the Layer 1 measurement report is to be transmitted as the first part and the second part.

Aspect 16: The method of Aspect 15, wherein the transmitted information indicates a timer associated with transmission of the Layer 1 measurement report as the first part and the second part.

Aspect 17: The method of any of Aspects 1-16, further comprising: transmitting a third part of the Layer 1 measurement report, wherein the third part includes measurement information for a third set of beams different than the first set of beams and the second set of beams.

Aspect 18: The method of any of Aspects 1-17, wherein the Layer 1 measurement report is based at least in part on at least one of: a Layer 1 signal to interference plus noise measurement, or a Layer 1 reference signal received power measurement.

Aspect 19: A method of wireless communication performed by a base station, comprising: receiving a first part of a Layer 1 measurement report, wherein the first part includes measurement information for a first set of beams; and receiving a second part of the Layer 1 measurement report, wherein the second part includes measurement information for a second set of beams, wherein the second set of beams is different than the first set of beams, wherein the first part and the second part are received using different time resources, and wherein the first set of beams and the second set of beams are associated with a single user equipment (UE).

Aspect 20: The method of Aspect 19, wherein the first set of beams includes one or more best beams, of a plurality of measured beams, based at least in part on measurements associated with the plurality of measured beams.

Aspect 21: The method of any of Aspects 19-20, wherein the first part is received based at least in part on a first periodicity and the second part is received based at least in part on a second periodicity different than the first periodicity.

Aspect 22: The method of any of Aspects 19-21, wherein receiving the first part and receiving the second part are based at least in part on a first periodicity, wherein the first periodicity is different than a second periodicity associated with receiving a one-part Layer 1 measurement report.

Aspect 23: The method of any of Aspects 19-22, further comprising: transmitting signaling indicating that the Layer 1 measurement report is to be transmitted as the first part and the second part, wherein receiving the first part and receiving the second part are based at least in part on the signaling.

Aspect 24: The method of Aspect 23, wherein the signaling comprises downlink control information or medium access control signaling, and wherein the signaling indicates a configuration associated with a semi-persistent or periodic report, wherein the configuration indicates that the Layer 1 measurement report is to be transmitted as the first part and the second part.

Aspect 26: The method of Aspect 23, wherein the signaling comprises configuration information for channel state information reporting.

Aspect 27: The method of any of Aspects 19-26, further comprising: receiving information indicating that the Layer 1 measurement report is to be transmitted as the first part and the second part.

Aspect 28: An apparatus for wireless communication at a device, comprising a processor; memory coupled with the processor; and instructions stored in the memory and executable by the processor to cause the apparatus to perform the method of one or more Aspects of Aspects 1-27.

Aspect 29: A device for wireless communication, comprising a memory and one or more processors coupled to the memory, the memory and the one or more processors configured to perform the method of one or more Aspects of Aspects 1-27.

Aspect 30: An apparatus for wireless communication, comprising at least one means for performing the method of one or more Aspects of Aspects 1-27.

Aspect 31: A non-transitory computer-readable medium storing code for wireless communication, the code comprising instructions executable by a processor to perform the method of one or more Aspects of Aspects 1-27.

Aspect 32: A non-transitory computer-readable medium storing a set of instructions for wireless communication, the set of instructions comprising one or more instructions that, when executed by one or more processors of a device, cause the device to perform the method of one or more Aspects of Aspects 1-27.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    determining that a Layer 1 measurement report is to be transmitted as a first part of the Layer 1 measurement report and a second part of the Layer 1 measurement report, wherein the first part of the Layer 1 measurement report includes measurement information for a first set of beams and the second part of the Layer 1 measurement report includes measurement information for a second set of beams, wherein the second set of beams is different than the first set of beams;
    transmitting the first part of the Layer 1 measurement report; and
    transmitting the second part of the Layer 1 measurement report, wherein transmitting the first part of the Layer 1 measurement report and the second part of the Layer 1 measurement report is based at least in part on determining that the Layer 1 measurement report is to be transmitted as the first part of the Layer 1 measurement report and the second part of the Layer 1 measurement report, and wherein the first part of the Layer 1 measurement report and the second part of the Layer 1 measurement report are transmitted using different time resources.

2. The method of claim 1, wherein the first set of beams includes one or more best beams, of a plurality of measured beams, based at least in part on measurements associated with the plurality of measured beams.

3. The method of claim 1, wherein the first part of the Layer 1 measurement report is transmitted using a first periodicity and the second part of the Layer 1 measurement report is transmitted using a second periodicity different than the first periodicity.

4. The method of claim 3, wherein the first part of the Layer 1 measurement report is transmitted more frequently than the second part of the Layer 1 measurement report based at least in part on the first periodicity and the second periodicity.

5. The method of claim 1, wherein transmitting the first part of the Layer 1 measurement report and transmitting the second part of the Layer 1 measurement report are based at least in part on a first periodicity, wherein the first periodicity is different than a second periodicity associated with transmitting a one-part Layer 1 measurement report.

6. The method of claim 5, wherein the first periodicity is shorter than the second periodicity.

7. The method of claim 1, further comprising:
receiving signaling indicating that the Layer 1 measurement report is to be transmitted as the first part of the Layer 1 measurement report and the second part of the Layer 1 measurement report, wherein transmitting the first part of the Layer 1 measurement report and transmitting the second part of the Layer 1 measurement report are based at least in part on the signaling.

8. The method of claim 7, wherein the signaling comprises downlink control information or medium access control signaling.

9. The method of claim 8, wherein the signaling indicates a configuration associated with a semi-persistent or periodic report, wherein the configuration indicates that the Layer 1 measurement report is to be transmitted as the first part of the Layer 1 measurement report and the second part of the Layer 1 measurement report.

10. The method of claim 7, wherein the signaling comprises configuration information for channel state information reporting.

11. The method of claim 10, wherein the configuration information is associated with periodic or semi-persistent channel state information reporting.

12. The method of claim 7, wherein the signaling indicates a timer associated with transmission of the Layer 1 measurement report as the first part of the Layer 1 measurement report and the second part of the Layer 1 measurement report.

13. The method of claim 1, wherein the determination is based at least in part on one or more measurements associated with the Layer 1 measurement report.

14. The method of claim 1, further comprising:
transmitting information indicating that the Layer 1 measurement report is to be transmitted as the first part of the Layer 1 measurement report and the second part of the Layer 1 measurement report.

15. The method of claim 14, wherein the transmitted information indicates a timer associated with transmission of the Layer 1 measurement report as the first part of the Layer 1 measurement report and the second part of the Layer 1 measurement report.

16. The method of claim 1, further comprising:
transmitting a third part of the Layer 1 measurement report, wherein the third part of the Layer 1 measurement report includes measurement information for a third set of beams different than the first set of beams and the second set of beams.

17. The method of claim 1, wherein the Layer 1 measurement report is based at least in part on at least one of:
a Layer 1 signal to interference plus noise measurement, or
a Layer 1 reference signal received power measurement.

18. A method of wireless communication performed by a base station, comprising:
receiving a first part of a Layer 1 measurement report, wherein the first part of the Layer 1 measurement report includes measurement information for a first set of beams; and
receiving a second part of the Layer 1 measurement report, wherein the second part of the Layer 1 measurement report includes measurement information for a second set of beams, wherein the second set of beams is different than the first set of beams, wherein the first part of the Layer 1 measurement report and the second part of the Layer 1 measurement report are received using different time resources, wherein receiving the first part of the Layer 1 measurement report and receiving the second part of the Layer 1 measurement report are based at least in part on a first periodicity, wherein the first periodicity is different than a second periodicity associated with receiving a one-part Layer 1 measurement report, and wherein the first set of beams and the second set of beams are associated with a single user equipment (UE).

19. The method of claim 18, wherein the first set of beams includes one or more best beams, of a plurality of measured beams, based at least in part on measurements associated with the plurality of measured beams.

20. The method of claim 18, further comprising:
transmitting signaling indicating that the Layer 1 measurement report is to be transmitted as the first part of the Layer 1 measurement report and the second part of the Layer 1 measurement report, wherein receiving the first part of the Layer 1 measurement report and receiving the second part of the Layer 1 measurement report are based at least in part on the signaling.

21. The method of claim 20, wherein the signaling comprises downlink control information or medium access control signaling, and wherein the signaling indicates a configuration associated with a semi-persistent or periodic report, wherein the configuration indicates that the Layer 1 measurement report is to be transmitted as the first part of the Layer 1 measurement report and the second part of the Layer 1 measurement report.

22. The method of claim 20, wherein the signaling comprises configuration information for channel state information reporting.

23. The method of claim 18, further comprising:
receiving information indicating that the Layer 1 measurement report is to be transmitted as the first part of the Layer 1 measurement report and the second part of the Layer 1 measurement report.

24. A user equipment (UE) for wireless communication, comprising:
a memory; and
one or more processors operatively coupled to the memory, the one or more processors configured to:
determine that a Layer 1 measurement report is to be transmitted as a first part of the Layer 1 measurement report and a second part of the Layer 1 measurement report, wherein the first part of the Layer 1 measurement report includes measurement information for a first set of beams and the second part of the Layer 1 measurement report includes measurement information for a second set of beams, wherein the second set of beams is different than the first set of beams;

transmit the first part of the Layer 1 measurement report; and transmit the second part of the Layer 1 measurement report, wherein the first part of the Layer 1 measurement report and the second part of the Layer 1 measurement report are transmitted based at least in part on determining that the Layer 1 measurement report is to be transmitted as the first part of the Layer 1 measurement report and the second part of the Layer 1 measurement report, and wherein the first part of the Layer 1 measurement report and the second part of the Layer 1 measurement report are transmitted using different time resources.

25. The UE of claim 24, wherein the first set of beams includes one or more best beams, of a plurality of measured beams, based at least in part on measurements associated with the plurality of measured beams.

26. The UE of claim 24, wherein the first part of the Layer 1 measurement report is transmitted using a first periodicity and the second part of the Layer 1 measurement report is transmitted using a second periodicity different than the first periodicity.

27. The UE of claim 24, wherein transmitting the first part of the Layer 1 measurement report and transmitting the second part of the Layer 1 measurement report are based at least in part on a first periodicity, wherein the first periodicity is different than a second periodicity associated with transmitting a one-part Layer 1 measurement report.

28. The UE of claim 27, wherein the first periodicity is shorter than the second periodicity.

29. A base station for wireless communication, comprising:
a memory; and
one or more processors operatively coupled to the memory, the one or more processors configured to:
receive a first part of a Layer 1 measurement report, wherein the first part of the Layer 1 measurement report includes measurement information for a first set of beams; and
receive a second part of the Layer 1 measurement report, wherein the second part of the Layer 1 measurement report includes measurement information for a second set of beams, wherein the second set of beams is different than the first set of beams, wherein the first part of the Layer 1 measurement report and the second part of the Layer 1 measurement report are received based at least in part on a first periodicity, wherein the first periodicity is different than a second periodicity associated with receiving a one-part Layer 1 measurement report, wherein the first part of the Layer 1 measurement report and the second part of the Layer 1 measurement report are received using different time resources, and wherein the first set of beams and the second set of beams are associated with a single user equipment (UE).

30. The base station of claim 29, wherein the first set of beams includes one or more best beams, of a plurality of measured beams, based at least in part on measurements associated with the plurality of measured beams.

* * * * *